US007969586B2

(12) United States Patent
Donath et al.

(10) Patent No.: US 7,969,586 B2
(45) Date of Patent: Jun. 28, 2011

(54) ELECTRONIC LEVELING APPARATUS AND METHOD

(75) Inventors: Bernd Donath, Jena (DE); Thomas Marold, Jena (DE)

(73) Assignee: Trimble Jena GmbH (DE)

( * ) Notice: Subject to any disclaimer, the term of this patent is extended or adjusted under 35 U.S.C. 154(b) by 337 days.

(21) Appl. No.: 12/358,131

(22) Filed: Jan. 22, 2009

(65) Prior Publication Data
US 2009/0158604 A1 Jun. 25, 2009

Related U.S. Application Data

(63) Continuation of application No. PCT/EP2006/009823, filed on Oct. 11, 2006.

(30) Foreign Application Priority Data

Aug. 1, 2006 (EP) .................................... 06016040

(51) Int. Cl.
*G01B 11/28* (2006.01)
(52) U.S. Cl. ........................................................ 356/630
(58) Field of Classification Search .................... 356/630
See application file for complete search history.

(56) References Cited

U.S. PATENT DOCUMENTS

| 4,715,714 A | 12/1987 | Gaechter et al. |
| 4,783,155 A | 11/1988 | Imataki et al. |
| 4,795,248 A | 1/1989 | Okada et al. |
| 5,537,200 A | 7/1996 | Kumagai et al. |
| 5,572,009 A | 11/1996 | Guertler |
| 5,802,206 A | 9/1998 | Marold |
| 5,815,233 A | 9/1998 | Morokawa et al. |
| 5,887,354 A | 3/1999 | Nagao |
| 6,076,267 A | 6/2000 | Gotoh |
| 6,108,920 A | 8/2000 | Kinoshita |
| 6,237,235 B1 * | 5/2001 | Feist et al. ....................... 33/295 |
| 6,369,954 B1 | 4/2002 | Berge et al. |

(Continued)

FOREIGN PATENT DOCUMENTS

CA 2368553 10/2000

(Continued)

OTHER PUBLICATIONS

Feist et al., "The New Digital Levels DiNi 10 and DiNi 20", Translation from: Vermessungswesen und Raumordnung "Die neuen Digitalnivelliere DiNi 10 und DiNi 20", 57(1995) 2, pp. 65-76.

(Continued)

*Primary Examiner* — Roy Punnoose
(74) *Attorney, Agent, or Firm* — Kilpatrick Townsend & Stockton LLP

(57) ABSTRACT

An electronic leveling apparatus for optically measuring a height difference relative to a leveling staff comprises a telescope, a camera fixed to the telescope, a first actuator for rotating both said telescope and said camera in a horizontal plane about a fixed vertical axis of the apparatus, and a controller. The camera has a depth of focus that is at least twice a depth of focus of the telescope. The controller uses a first output signal from said telescope to output a leveling signal representing a detected height difference. The controller uses a second output signal from said camera to identify a representation of a leveling staff and to control the first actuator based on the identified representation of the leveling staff. Furthermore a method for optically measuring a height difference of an electronic leveling apparatus relative to a leveling staff is provided.

21 Claims, 5 Drawing Sheets

U.S. PATENT DOCUMENTS

| | | | |
|---|---|---|---|
| 6,734,952 | B2 | 5/2004 | Benz et al. |
| 2003/0089837 | A1 | 5/2003 | Marold |
| 2004/0163266 | A1 | 8/2004 | Kaneko |
| 2008/0259449 | A1 | 10/2008 | Fruhmann et al. |

FOREIGN PATENT DOCUMENTS

| | | | |
|---|---|---|---|
| DE | 34 24 806 | A1 | 8/1985 |
| DE | 37 39 664 | A1 | 7/1988 |
| DE | 39 16 385 | A1 | 1/1990 |
| DE | 42 17 000 | A1 | 11/1993 |
| DE | 43 38 038 | C1 | 3/1995 |
| DE | 195 00 817 | C1 | 2/1996 |
| DE | 197 06 970 | C1 | 8/1997 |
| DE | 197 23 654 | A1 | 1/1998 |
| DE | 197 06 790 | A1 | 8/1998 |
| DE | 198 04 198 | A1 | 8/1998 |
| DE | 198 33 996 | C1 | 12/1999 |
| EP | 0 576 004 | A1 | 12/1993 |
| EP | 0 977 011 | A1 | 2/2000 |
| EP | 1 037 014 | A2 | 9/2000 |
| EP | 1 347 267 | A1 | 9/2003 |
| WO | WO 02/05005 | A1 | 1/2002 |
| WO | WO 2006/056475 | A1 | 6/2006 |

OTHER PUBLICATIONS

International Search Report and Written Opinion of PCT Application No. PCT/EP2006/009823 (publication No. WO/2008/014813), dated May 24, 2005, 10 pages total.

\* cited by examiner

ELECTRONIC LEVELING APPARATUS AND METHOD

CROSS-REFERENCES TO RELATED APPLICATIONS

This application claims priority to and is a continuation of International Patent Application PCT/EP2006/009823 filed on Oct. 11, 2006, which claims priority to European Patent Application EP 06016040.5, filed on Aug. 1, 2006, the disclosures of which are hereby incorporated by reference in their entirety.

BACKGROUND OF THE INVENTION

The present invention relates to the field of optical measurement and especially to geodetic measurement instruments. In particular, the invention relates to an electronic leveling apparatus and method for measuring a height difference between the electronic leveling apparatus and a leveling staff.

SUMMARY OF THE INVENTION

An electronic leveling apparatus is a special geodetic measurement instrument for optically measuring a height difference relative to a leveling staff, and thus a height difference between the instrument and the leveling staff.

In general, the electronic leveling apparatus comprises at least a telescope including an optical detector, an optical system for generating an image on the optical detector and a controller. The controller is configured to receive an output signal from said optical detector and to output a leveling signal representing a detected height difference based on the output signal.

In this respect the use of a leveling staff separate from the apparatus is necessary to conduct a measurement using an electronic leveling apparatus. A scale (measure) indicating a height relative to ground is provided on a surface of the leveling staff in the direction of elongation of the leveling staff (e.g. in the form of a coded pattern).

During measurement, the leveling staff is brought in line with an optical axis of the optical system of the apparatus. At this stage, the optical axis of the optical system has to be arranged in a horizontal plane. After alignment, the optical system generates an image of at least a part of the scale provided on the measuring staff on the optical detector. The image is analyzed to read the scale of the leveling staff in the middle of the image. The corresponding value is output as being the height difference between the apparatus and the leveling staff.

The above method and apparatus is explained in more detail in the essay "Die neuen Digitalnivelliere DiNi 10 und DiNi20" of Wieland Feist, Klaus Gürtler, Thomas Marold and Holger Rosenkranz, published in April 1995 in volume 57, issue 2 of the journal "VR Vermessungswesen und Raumordnung". This journal is issued by Hanns J. Meckenstock, Domagkweg 90, D-42109 Wuppertal, Germany. The content of this essay is herewith incorporated by reference.

Another electronic leveling apparatus according to the prior art is known from EP 1 037 014 A2.

Examples of measurement staffs and methods of analyzing an image imaging these measurement staffs are disclosed in documents DE 197 06 790 A1 and U.S. Pat. No. 5,572,009. The content of these documents is incorporated by reference to become part of the present disclosure.

In the electronic leveling apparatus described above it is very time-consuming to manually bring the leveling staff into line with the optical axis of the optical system.

In this respect, U.S. Pat. No. 5,537,200 proposes to further provide the leveling apparatus with a turning drive means for turning it on a horizontal plane, a light emission means for emitting a light beam, a light reception means for receiving a reflected light of the emitted light beam, and a signal processor for controlling the turning drive means in response to the received signal. During operation, a reflector for reflecting the light beam emitted by the light emission means is arranged next to the leveling staff. By driving the turning drive means and stopping the turning drive means as soon as a light beam reflected by the reflector is received by the light reception means, it is determined that an optical axis of a telescopic system of the apparatus is aligned to the leveling staff.

In the above leveling apparatus described in U.S. Pat. No. 5,537,200 a light beam reflected by the reflector is not only received by the light reception means but also by the telescopic system of the apparatus. Therefore, the reflected light beam superimposes an image received by the telescopic system. In consequence, it is frequently difficult to correctly analyze the image to read the scale of the leveling staff in the middle of the image. Thus, the height difference between the apparatus and the leveling staff frequently cannot be established with sufficient accuracy. Moreover, the light beam may be reflected by a reflecting surface other than the reflector. In this case, proper alignment of the optical axis of the telescopic system and the leveling staff is not possible.

It has been found that the conventional electronic leveling apparatus could still be improved to obtain measuring results more reliable, more accurate and more comfortable.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

Figure 1:
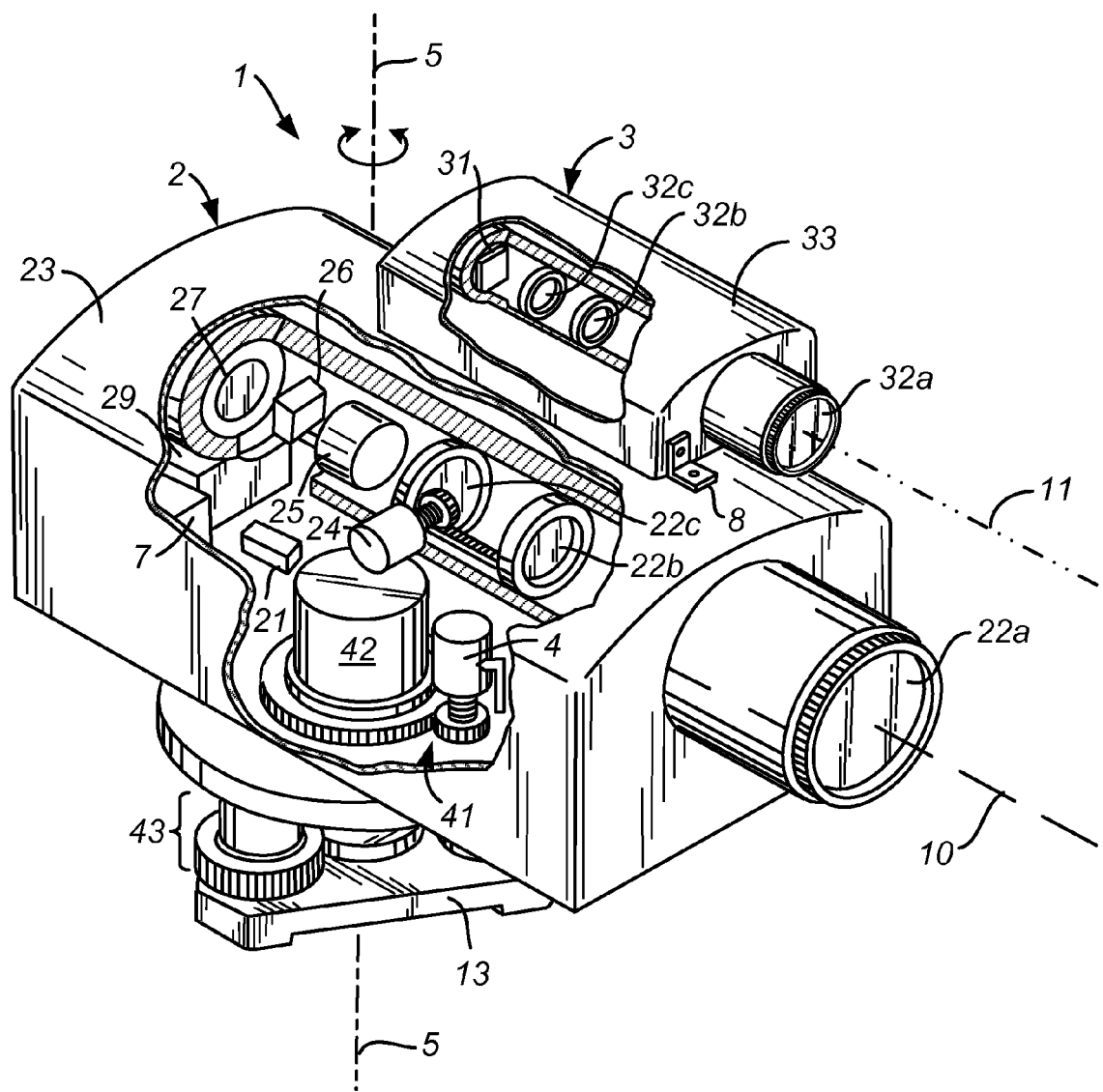
FIG. 1 is a perspective view of an electronic leveling apparatus 1, according to an exemplary embodiment of the present invention.

LIST OF REFERENCE SIGNS 1, 1', 1", 1''' electronic leveling apparatus
2 telescope
20 reticle
21 first optical detector (linear CCD-detector)
22a, 22b, 22c optical lenses of first optical system
23 housing of telescope
24 second actuator (focusing stepper motor)
25 compensator
26 beam splitter
27 eyepiece
28 first optical system
29 clinometer
3 camera (wide-angle camera)
31 second optical detector (array CCD-detector)
32, 32a, 32b, 32c optical lenses of second optical system
33 housing of camera (wide-angle camera)
38 second optical system
4 first actuator (first stepper motor)
41 gear system
42 pivot
43 tribrach
5 fixed vertical axis
6 tripod
7 controller (microcomputer)
8 mount
9 leveling staff
91 shank
92 scale (pattern)
93, 94 border
10 optical axis of first optical system
11 optical axis of second optical system
12 object plane
13 base plate
14 display
15 user interface
16 memory
17 representation of leveling staff
18 two-dimensional image represented by second output signal
19 auxiliary means
50 prism
50' beam splitter
51 aperture
F1/F2 depth of focus of first/second optical system
V1/V2 field of view of first/second optical system
D distance between first optical system and object plane
R row direction
G gap between optical lenses of first optical system
Pxy light sensitive element (pixel)

DETAILED DESCRIPTION OF THE INVENTION

The present invention has been accomplished taking the above problems into consideration.

Embodiments of the present invention provide an electronic leveling apparatus that has a high degree of automation and is capable of detecting a height difference between the apparatus and a leveling staff with relatively high accuracy.

Furthermore, embodiments of the present invention provide a method for optically measuring a height difference of an electronic leveling apparatus relative to a leveling staff that has a high degree of automation and is capable of detecting a height difference between the apparatus and a leveling staff with relatively high accuracy.

According to embodiments of the present invention, an electronic leveling apparatus for optically measuring a height difference relative to a leveling staff comprises a telescope including a first optical detector and a first optical system for generating an image on the first optical detector, a camera including a second optical detector and a second optical system for generating an image on the second optical detector, wherein an orientation of the camera is fixed relative to the telescope, a first actuator for rotating both said telescope and said camera in a horizontal plane about a fixed vertical axis of the apparatus, and a controller. The controller is configured to receive a first output signal from said first optical detector and to output a leveling signal representing a detected height difference based on the first output signal from the first optical detector. The second optical system has a depth of focus that is at least twice a depth of focus of the first optical system. Moreover, the controller is further configured to receive a second output signal from said second optical detector, to identify a representation of the leveling staff in the second output signal received from the second optical detector, and to control the first actuator based on the identified representation of the leveling staff.

In this respect the rotation of both said telescope and said camera in a horizontal plane about a fixed vertical axis of the apparatus includes the case where the apparatus does not comprise any means to rotate at least one of said telescope and said camera about a horizontal axis in a vertical plane. Moreover, the camera can be fixed to the telescope during at least one measurement of a height difference between said apparatus relative to a leveling staff and rotation of both said telescope and said camera in a horizontal plane. Thus a relation between a first optical axis defined by the first optical system of the telescope and a second optical axis defined by the second optical system of the camera can be maintained constant. It is obvious that the position of the electronic leveling apparatus having said fixed vertical plane can be changed.

According to this embodiment the controller identifies a representation of the leveling staff in the second output signal. In this respect, the term "a representation of the leveling staff" denotes a representation in the second output signal that is caused by at least one of the leveling staff as a whole and a section of the leveling staff (like e.g. the whole or a part of the shank or scale or border of the leveling staff). According to a further embodiment, the controller performs this identification either automatically (and thus without user interference) or after receipt of a corresponding command via a user interface.

As the depth of focus of the second optical system is at least twice the depth of focus of the first optical system, the likelihood that the leveling staff will be identified in the second output signal is significantly increased. The reason is that an optical system having an increased depth of focus is more likely to be able to focus on a leveling staff arranged at an unknown distance from the optical system than an optical system having a lower depth of focus.

In this respect, the depth of focus might be calculated by the following formula: $F=\lambda/A^2$, wherein $\lambda$ is the wavelength of received light and A is the numeric aperture of the optical system through which the light is received. The numeric aperture is half the diameter of the optical system, divided by the focal length f.

Thus, by using the representation identified in the second optical system (that has the increased depth of focus) to control the first actuator for rotating both said telescope and said camera, the first optical system of the telescope can be oriented towards the leveling staff with ease and high reliability. Moreover, any deterioration of the image received by the first optical detector is avoided, to guarantee a relatively high accuracy of the measurement of a height difference between said apparatus and said leveling staff through the operation of sighting said leveling staff with the telescope.

In the present patent application, accuracy is considered as being relatively high if a discrepancy of a height difference between said apparatus and said leveling staff measured by the apparatus and the true height difference is no more than 5 mm/km or 3 mm/km or better, such as no more than 0.5 mm/km.

According to an exemplary embodiment, the second optical system may have a depth of focus that is one of at least four times the depth of focus of the first optical system and ten times the depth of focus of the first optical system. Thus, the respective depth of focus of the first and second optical systems can even differ by more than one exponential. The depth of focus of the second optical system might even be infinite.

According to another embodiment, a field of view of the second optical system in a certain object plane regarding one dimension is one of at least six times the field of view of the first optical system in the same object plane and at least eight times the field of view of the first optical system in the same object plane and at least ten times the field of view of the first optical system in the same object plane.

The respective field of view can be detected with ease e.g. by arranging an object in an object plane, identifying a representation of the same object in the first and second output signal and comparing the size of the representation of the object in the first and second output signal, respectively, with one another. Thus, if e.g. a representation of the object in the first output signal has a length of 2 cm and a representation of the same object arranged at the same distance in the second output signal has a length of 0.2 cm, it can be concluded that regarding one dimension the field of view of the second optical system is 10-times the field of view of the first optical system (corresponds to $10^2=100$ times regarding two dimensions).

In this respect both the object and the object plane can be chosen arbitrarily.

The larger the field of view of the second optical system is, the higher is the likelihood that the leveling staff is arranged in the field of view of the second optical system. Nevertheless, the size of representation of the leveling staff in the second output signal usually decreases as the field of view of the second optical system increases. Thus, it becomes more difficult to reliably identify the representation of the leveling staff in the second output signal as the field of view of the second optical system increases. Thus, according to an exemplary embodiment the field of view of the second optical system does not become more than thirty times and particular not more than fifteen times the field of view of the first optical system regarding one dimension.

According to exemplary embodiments of the present invention the controller can be configured to control said first actuator such that an optical axis of the first optical system is aligned with the identified representation of the leveling staff. Thus, a measurement of a height difference between the electronic leveling apparatus and the leveling staff might be conducted immediately after rotation of both said telescope and said camera by controlling said first actuator.

According to an embodiment, the controller is configured to identify a representation of the leveling staff in the second output signal by comparing the second output signal of the second optical detector with a first preset pattern signal.

Said first preset pattern signal can be a signal pattern that is typically caused in the second output signal by the presence of a leveling staff. Such a first preset pattern signal may be determined, for example, by experiment by arranging the same leveling staff at different environments in a field of view of the second optical system of the camera and establishing a common signal pattern in the respective second output signals of the second optical detector of the camera. Alternatively, said first preset pattern signal may be calculated for a known leveling staff in an analytic way.

According to another embodiment, the controller may be configured to identify a representation of the leveling staff in the second output signal by detecting edges in the two-dimensional image represented by the second output signal. These edges can be used to locate a rectangular element in the two-dimensional image the width-to-height ratio of which meets a preset value for a respective leveling staff.

Thus, this approach is based on the finding that using standard image calculating routines may perform the detection of edges in an image. As leveling staffs usually have a characteristic longish shape and thus a characteristic width-to-height ratio uncommon in natural environments, this ratio might be used to identify the leveling staff without complicated picture analysis.

According to a further embodiment, the controller can be configured to identify a representation of the leveling staff by detecting a characteristic color preset for a respective leveling staff in the second output signal of the second optical detector.

Thus, this approach is based on the finding that leveling staffs frequently use signal colors that are not present in normal environments. This characteristic color might, for example, be found on the shank or scale or border of the leveling staff. Nevertheless, the characteristic color does not necessarily have to be part of the leveling staff itself but might be present on a separate marker element attached to the leveling staff, for example. The usage of a separate marker element allows easy adaptation of the characteristic color to different environments of the electronic leveling apparatus. In the present application the term "characteristic color" is not limited to one single color but covers even preset combinations or patterns of different colors.

The controller either might identify the representation of the leveling staff in the second output signal directly or in a two-dimensional image represented by the second output signal.

According to an exemplary embodiment, the first optical system comprises plural optical lenses for generating the image on the first optical detector and a second actuator for adjusting a distance between the first optical system and an object plane imaged by the optical lenses of the first optical system on the first optical detector.

In this respect, said second actuator may adjusts the distance between the first optical system and the object plane, for example, by adjusting a gap between at least two optical lenses of the first optical system. Alternatively, said second actuator may adjust the distance by controlling an optical lens having a variable refraction (such lenses are described as liquid lenses in U.S. Pat. No. 6,369,954 B1, CA 2,368,553 and U.S. Pat. No. 4,783,155 or liquid crystal lenses in U.S. Pat. Nos. 4,795,248 and 5,815,233, the disclosures of which are hereby incorporated by reference) that is arranged in an optical path of the first optical system, for example.

In this embodiment, the controller may be further configured to control said second actuator based on the second output signal received from said second optical detector.

For example, control might be performed such that an image of the leveling staff as a whole, or a part of the leveling staff (and especially at least a part of the scale of the leveling staff), generated by the first optical system on the first optical detector is focused. This control of the second actuator based on the second output signal does not exclude an additional or alternative control based on the first output signal. Thus, the focusing based on the second output signal does not necessarily have to be perfect. An approximate focusing might be sufficient.

Moreover, in this embodiment the controller may further be configured to control said second actuator based on the first output signal of the first optical detector.

This control can be such that an image of the leveling staff, or a part of the leveling staff (and especially the scale or part of the scale of the leveling staff), generated by the first optical system on the first optical detector is focused. Using well-known techniques like e.g. searching an output signal comprising an image of maximal sharpness can perform this focusing. An exemplary focusing method according to the prior art is described in WO 02/05005A1. This method is incorporated by reference. According to a non-limiting example, control may be such that the first output signal of the first optical detector corresponds to a second preset pattern signal that corresponds to a typical pattern on the leveling staff, for example.

According to a further embodiment, the controller is further configured to approximately detect a distance between the electronic leveling apparatus and the leveling staff based on the identified representation of the leveling staff by comparing a size of the identified representation of the leveling staff in the second output signal with a preset value for a respective leveling staff.

The detected distance might be used to control said second actuator such that the point of focus of the first optical system is approximately adjusted to the detected distance between the electronic leveling apparatus and the leveling staff, for example. In this respect, adjustment of the point of focus to the detected distance means that the depth of focus of the first optical system covers the detected distance between the electronic leveling apparatus and the leveling staff. As size of the identified representation of the leveling staff, any characteristic physical dimension of the leveling staff such as length or width can be used.

According to a further embodiment, the electronic leveling apparatus comprises a compensator for maintaining an optical axis of the first optical system in horizontal alignment.

This compensator is adapted to account for small deviations of the optical axis of the first optical system from the horizontal plane in an optical or mechanical or opto-mechanical manner. The compensator may be contained in the first optical system and may directly correct the optical axis of the first optical system, for example.

According to a further embodiment, the electronic leveling apparatus comprises a clinometer, wherein the clinometer is adapted for measuring a deviation of a position of an optical axis of said first optical system relative to the horizon.

An electronic leveling apparatus using such a clinometer is known from U.S. Pat. No. 6,237,235, the entire content of which is incorporated by reference.

Thus, the clinometer can be used to control compensation of the leveling signal output by the electronic leveling apparatus, or to perform a digital correction of the first output signal if a distance between the leveling apparatus and the leveling staff has been determined, for example.

In this respect, for example, the optical axis that is considered by the clinometer may be formed by a center pixel of the first optical detector.

According to an exemplary embodiment, said first optical detector is a one-dimensional sensor having a row of light sensitive elements and said second optical detector is a two-dimensional sensor having an array of light sensitive elements.

In this respect, a one-dimensional sensor shall comprise more than 100 and in particular more than 500 and in particular more than 1500 light sensitive elements in row direction and less than 50 and in particular less than 10 and in particular less than 5 light sensitive elements in cross row direction. A typical example of a suitable one-dimensional sensor might comprise 2048 elements in the row direction and 2 elements in cross row direction.

An array of light sensitive elements of a two-dimensional sensor shall comprise more than 100 and in particular more than 200 and in particular more than 400 light sensitive elements in row direction and more than 100 and in particular more than 200 and in particular more than 400 light sensitive elements in cross row direction. A typical example of a suitable two-dimensional sensor might comprise 640 elements in row direction and 480 elements in cross row direction.

According to an exemplary embodiment, at least one of said optical detectors is a Charge-Coupled Device (CCD) or CMOS image detector.

According to a further embodiment, the leveling staff has a pattern of alternating light reflectivity arranged in the direction of elongation of the leveling staff and the controller is configured to generate said leveling signal representing a detected height difference by analyzing the respective pattern of the leveling staff contained in the first output signal of the first optical detector.

This pattern may directly indicate height information in coded form. Thus, the leveling staff and not the leveling apparatus represents the material measure for the measurement. The pattern contained in the first output signal can be analyzed to measure the relative height difference between the apparatus and the leveling staff.

According to an exemplary embodiment, a first optical axis of the first optical system of the telescope and a second optical axis of the second optical system of the camera coincide at least partially. Thus, at least sections of the first and second optical axes are arranged coaxially.

In this respect, according to an exemplary embodiment, the electronic leveling apparatus further comprises a beam splitter. The beam splitter is adapted to separate the first optical axis of the first optical system and the second optical axis of the second optical system by directing the first optical axis towards the first optical detector and by directing the second optical axis towards the second optical detector.

According to embodiments of the present invention, a method for optically measuring a height difference of an electronic leveling apparatus relative to a leveling staff is disclosed. The apparatus comprises a first optical detector and a first optical system for generating an image on the first optical detector, and a second optical detector and a second optical system for generating an image on the second optical detector, wherein an orientation of the second optical system is fixed relative to the first optical system, and wherein the second optical system has a depth of focus that is at least twice a depth of focus of the first optical system. The method comprises receiving a second output signal from said second optical detector, identifying a representation of the leveling staff in the second output signal received from the second optical detector, rotating said first optical detector, said first optical system, said second optical detector and said second optical system simultaneously in a horizontal plane about a fixed vertical axis based on the identified representation of the leveling staff, receiving a first output signal from said first optical detector, and outputting a leveling signal representing a detected height difference based on the first output signal from the first optical detector.

According to embodiments of the above method, the electronic leveling apparatus is an apparatus as described above.

A computer-readable carrier containing information representing a computer program adapted to cause a processing unit to execute the methods described therein is further provided. The computer-readable carrier can be any suitable type of carrier such as a solid-state memory, a magnetic memory, optical memory, other type of memory, or modulated waves/signals (e.g., radio frequency, audio frequency, or optical frequency modulated waves/signals) suitable for being transmitted through any suitable network, such as the Internet.

The processing unit may be part of the controller of the above described electronic leveling apparatus.

The embodiments and aspects described above do not have to be considered separately but may be combined with one another.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

In the following, an embodiment of an electronic leveling apparatus, and a method for optically measuring a height difference of an electronic leveling apparatus relative to a leveling staff, are described with reference to the accompanying FIGS. 1, 2A, 2B and 3.

Figure 3:
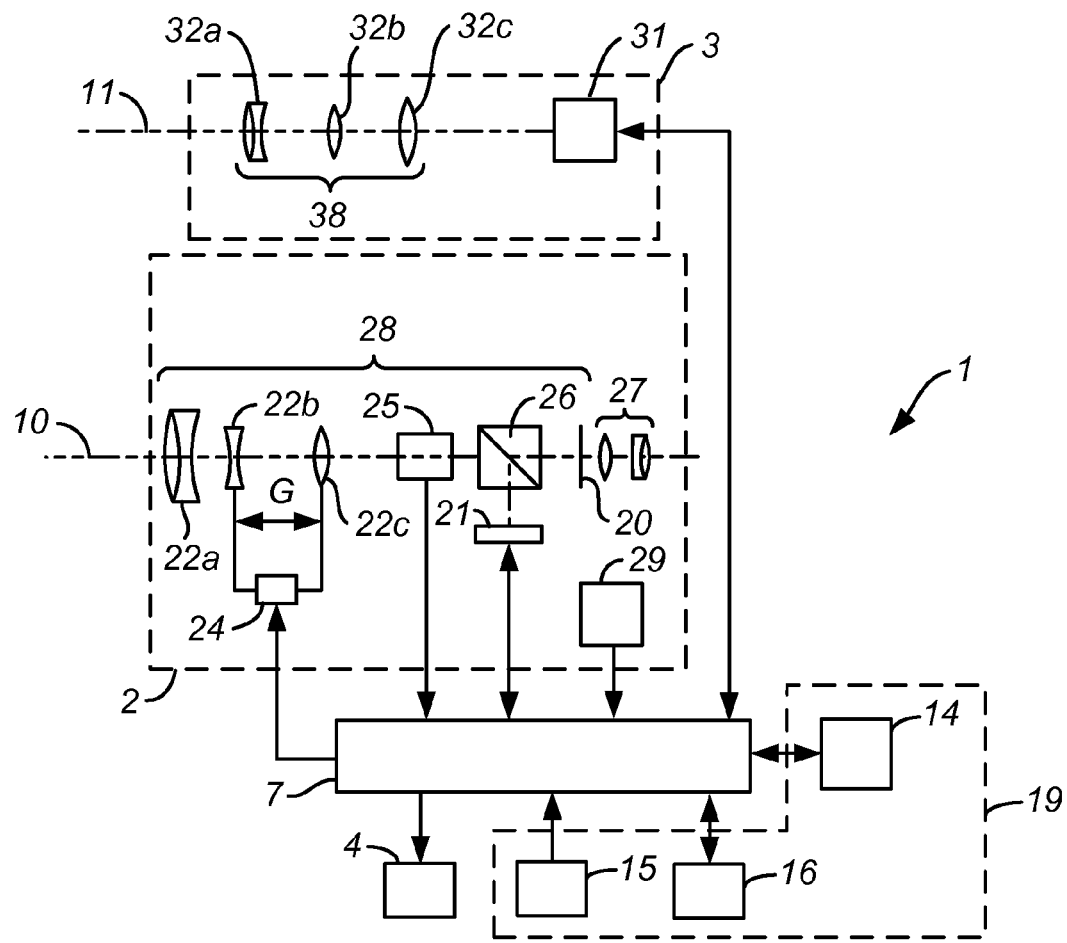
FIG. 3 is a block diagram showing the arrangement of basic parts of the electronic leveling apparatus of FIG. 1.

As best shown in FIG. 3, the electronic leveling apparatus 1 of an exemplary embodiment basically consists of a telescope 2, a camera, a pivoting stepper motor 4, a controller and auxiliary means 19. In the present embodiment, the camera is a wide-angle camera 3 and the controller is a microcomputer 7.

The telescope 2 basically consists of a first optical system 28, a linear CCD-detector 21 constituting a first optical detector, a beam splitter 26, an eyepiece 27 and a focusing stepper motor 24. The first optical system 28 consists of plural optical lenses 22a, 22b and 22c, a reticle 20 (not shown in FIG. 1) and a compensator 25 that define an optical axis 10 of the first optical system 28. The compensator 25 is an automatic mechanism for maintaining the optical axis 10 horizontal and is arranged in an optical path of the first optical system 28. The compensator 25 is connected to the microcomputer 7 to output a warning signal if an inclination of the telescope 2 is such that automatic compensation of the optical axis 10 by the compensator 25 is no longer possible.

FIG. 3 shows a clinometer 29 in addition to the compensator 25. The clinometer 29 is adapted for measuring the deviation of the position of the optical axis 10 of the telescope 2 relative to the horizon. In the present case, the optical axis 10 is formed by a center pixel of the linear CCD-detector 21. Based an output signal of the clinometer 29, the microcomputer 7 is adapted to perform a digital correction of an output signal of the linear CCD-detector 21. To perform this correction, a distance between the electronic leveling apparatus 1 and a leveling staff 9 has to be considered. Detection of said distance will be explained at a later passage of this document.

It is emphasized that provision of either the clinometer 29 or the compensator 25 is sufficient for most applications.

The optical lenses 22a, 22b and 22c reproduce an image plane (not shown in the Figures) of the first optical system 28 into an intermediate picture at the reticle 20.

Figure 2A:
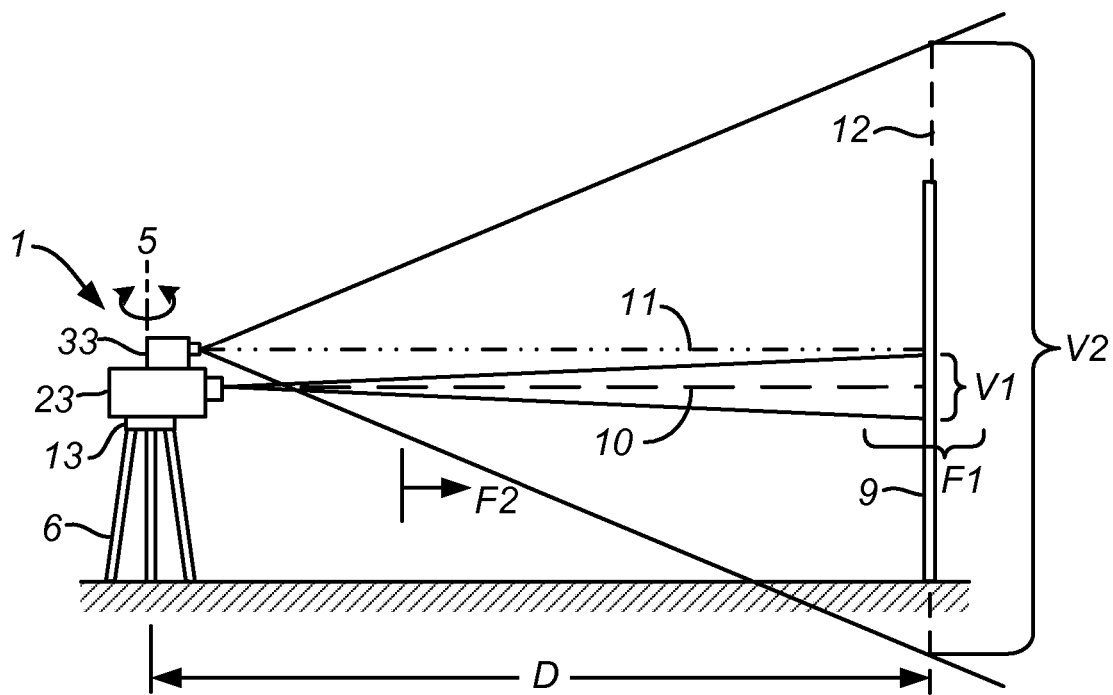
FIG. 2A is a schematic side view of the electronic leveling apparatus 1 and a leveling staff 9 during a measurement operation.
Figure 2B:
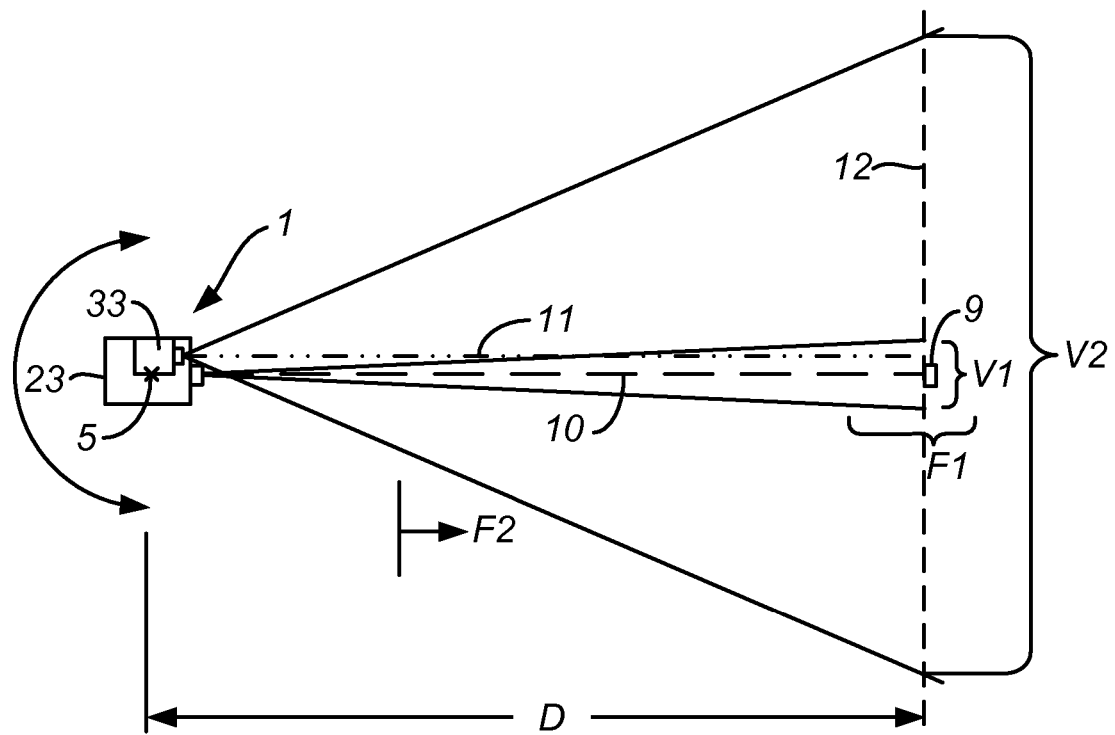
FIG. 2B is a top view of FIG. 2A.

By using the beam splitter 26, the optical lenses 22a, 22b and 22c are adapted to generate an image on both the linear CCD-detector 21 and the reticle 20. A user looking into the eyepiece 27 may observe the intermediate image generated on the reticle 20. The focusing stepper motor 24 is adapted to adjust a distance D between the first optical system 28 and the object plane 12 imaged by the optical lenses 22a, 22b and 22c on the linear CCD-detector 21 by adjusting a gap G between the lenses 22b and 22c of the first optical system 28. This distance D is shown in FIGS. 2A and 2B.

Figure 5A:
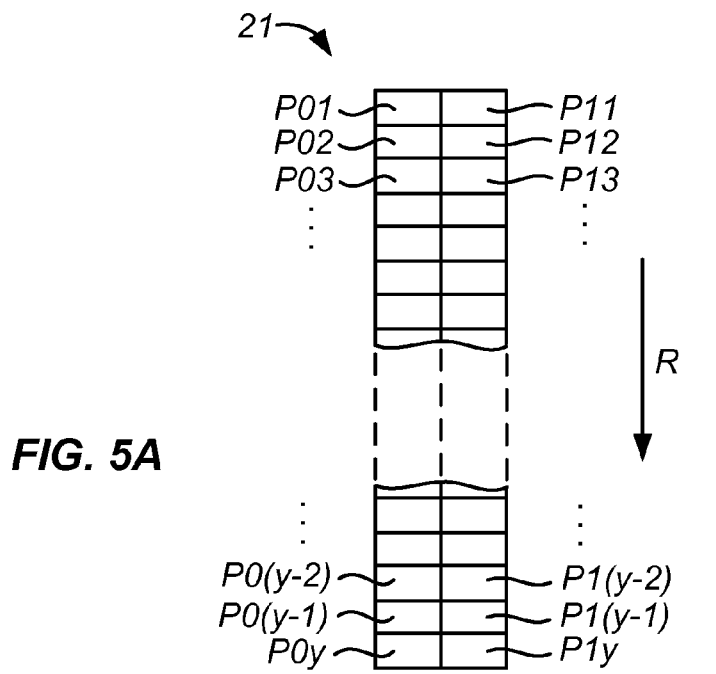
FIG. 5A schematically shows the structure of a linear optical detector that may be used with the electronic leveling apparatus.

As it is best shown in FIG. 5A, the linear CCD-detector 21 is basically a one-dimensional sensor having two parallel rows of pixels (light sensitive elements) $P01$-$P1y$. In the present embodiment, each of the two rows consists of more than 1500 pixel $P01$-$P0y$, $P11$-$P1y$. In the present embodiment, the number of pixel $P01$-$P0y$, $P11$-$P1y$ of each row in row direction R is 2048. Thus, the wildcard character "y" is 2048.

The eyepiece 27 may be used to control or correct alignment of the optical axis 10 of the telescope 2 of the electronic leveling apparatus 1 with respect to the leveling staff 9.

The pivoting stepper motor 4 and most parts of the telescope 2 (the optical lenses 22a, 22b and 22c, the compensator 25, the reticle 20, the clinometer 29, the beam splitter 26, the linear CCD-detector 21, the focusing stepper motor 24 and part of the eyepiece 27) are arranged in a housing 23 of the telescope 2.

The housing 23 of the telescope 2 is attached via a pivot 42 and a tribrach 43 to a base plate 13. As it is shown in FIGS. 2A and 2B, the base plate 13 is part of the tribrach 43 that is mountable on a tripod.

The wide-angle camera 3 contains plural optical lenses 32a, 32b and 32c forming a second optical system 38 and an array CCD-detector 31. The optical lenses 32a, 32b and 32c define an optical axis 11 of the second optical system 38 and are adapted to generate a two-dimensional image on the array CCD-detector 31.

Figure 5B:
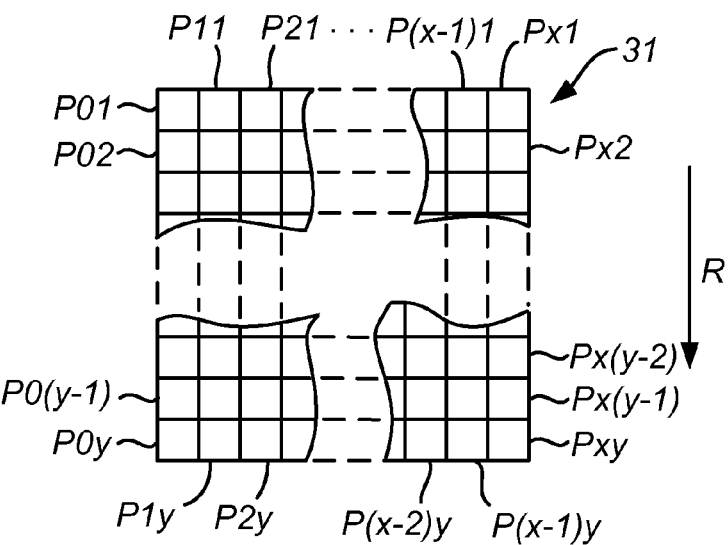
FIG. 5B schematically shows an array optical detector that may be used with the electronic leveling apparatus.

As it is best shown in FIG. 5B, the array CCD-detector 31 is a two-dimensional sensor comprising more than 400 light sensitive elements (pixel) $P01$-$Pxy$ in both row direction R, and cross row direction. In the present embodiment, the number of pixel $P01$-$P0y$, $P11$-$P1y$, ..., $P(x-1)1$-$P(x-1)y$, $Px1$-$Pxy$ of each row in row direction R is 640. Thus, the wildcard character "y" is 640. The number of pixel $P01$-$Px1$, $P02$-$Px2$, ..., $P0(y-1)$-$Px(y-1)$, $P0y$-$Pxy$ in the cross row direction is 480. Thus, the wildcard character "x" is 480.

The array CCD-detector 31 and the optical lenses 32a, 32b and 32c are mounted in a housing 33. The housing 33 of the wide-angle camera 3 is fixed to the housing 23 of the telescope 2 via a bracket 8. The bracket 8 allows some adjustment of the both housings 23 and 33 (and thus of the telescope 2 and the wide-angle camera 3) relative to each other. During operation, the orientation of the optical axis 11 of the wide-angle camera 3 is maintained constant with respect to the optical axis 10 of the telescope 2.

The telescope 2 and the wide-angle camera 3 can be rotated about the pivot 42 by using the pivoting stepper motor 4 and a gear system 41 (that is also contained in the housing 23 of the telescope 2) around a fixed vertical axis 5. In consequence, both the optical axis 10 of the telescope 2 and the optical axis 11 of the wide-angle camera 3 can be rotated in a respective horizontal plane (not shown).

In the present embodiment, the microcomputer 7 is also provided inside the housing 23 of the telescope 2. Alternatively, the microcomputer might be provided in the base plate 13, for example.

The microcomputer 7 is connected to the linear CCD-detector 21, the focusing stepper motor 24, the compensator 25, and/or the clinometer 29 of the telescope 2, the array CCD-detector 31 of the wide-angle camera 3, the pivoting stepper motor 4, a display 14, a user interface 15 and a memory 16 of the auxiliary means 19. Connection of the microprocessor 7 to the compensator 25 is only facultative as the compensator 25 may be a mechanical device.

In the following, the function of the leveling apparatus 1 will be briefly described.

Figure 6:
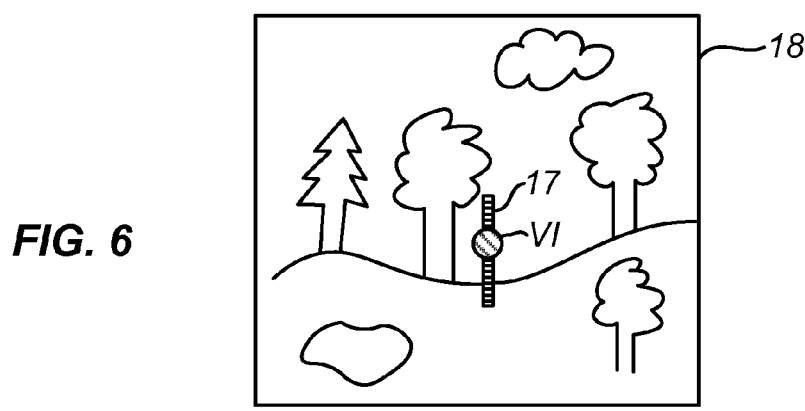
FIG. 6 schematically shows a two-dimensional image that might be generated by the leveling apparatus.

At the beginning of a measurement operation that might be triggered by a user via the user interface 15, the microcomputer 7 controls the pivoting stepper motor 4 such that both the telescope 2 and the wide-angle camera 3 are rotated about the vertical axis 5. In the meantime, the microcomputer 7 receives a picture signal (second output signal) representing a two-dimensional image 18 from the array CCD-detector 31. The rotation of the telescope 2 and the wide-angle camera 3 is maintained until the microcomputer 7 identifies a representation 17 of a leveling staff 9 in the picture signal. Such a representation 17 in a two-dimensional image 18 is shown in FIG. 6.

Based on the identified representation 17 of the leveling staff 9, the microcomputer 7 controls the pivoting stepper motor 4 such that the optical axis 10 of the first optical system 28 of the telescope 2 is automatically aligned with the identified representation 17 of the leveling staff 9 by rotation of both the telescope 2 and the wide-angle camera 3.

In more detail, the microcomputer 7 determines a position of the identified representation 17 in the two-dimensional image 18 represented by the picture signal received from the wide-angle camera 3. By considering a dependency of the optical axes 10 and 11 of the telescope 2 and the wide-angle camera 3 relative to one another, it can be defined which area of the two-dimensional image 18 approximately corresponds to the optical axis 10 of the telescope 2. When the optical axes 10 and 11 of the telescope 2 and the wide-angle camera 3 are not arranged in one common vertical plane (as it is the case in FIG. 1), distance information regarding the distance between the electronic leveling apparatus 1 and the leveling staff 9 is additionally taken into account. Detection of said distance is described in more detail below. When the optical axes 10 and 11 of the telescope 2 and the wide-angle camera 3 are approximately arranged in one common vertical plane said distance information is not necessary to define the area in the two-dimensional image 18 that approximately corresponds to the optical axis 10 of the telescope 2. Thus, the pivoting stepper motor 4 is actuated by the microcomputer 7 until the identified representation 17 of the leveling staff 9 is arranged in this area.

The dependency of the optical axis 10 and 11 of the telescope 2 and the wide-angle camera 3 relative to one another can either be preset or be determined by a simple calibration procedure. If the optical axis 10 and 11 of the telescope 2 and the wide-angle camera 3 are parallel to one another and span one common vertical plane, the area is usually the centre of the two-dimensional image 18.

In the present embodiment, the second optical system 28 of the wide-angle camera 3 has a nearly infinite depth of focus F2. In contrast, the depth of focus F1 of the first optical system 28 of the telescope 2 is only 10 meters. Thus, the depth of focus F2 of the wide-angle camera 3 is more than ten times the depth of focus F1 of the telescope 2. Moreover, regarding one dimension a field of view V2 of the second optical system 28 in an object plane 12 defined by the leveling staff 9 is ten times a field of view V1 of the first optical system 28 of the telescope 2 in the same object plane 12.

Due to the high depth of focus F2 and the high field of view V2 of the wide-angle camera 3, the microcomputer 7 can identify the representation 17 of the leveling staff 9 with high reliability.

The present invention is not restricted to the above dependency of the depth of focus F2 and/or the field of view V2 of the second optical system 38 of the wide-angle camera 3 with respect to the depth of focus F2 and/or the field of view V2 of the first optical system 28 of the telescope 2.

In fact, it is frequently sufficient if the depth of focus F2 of the wide-angle camera 3 is at least twice and in particular at least four times and in particular at least ten times the depth of focus F1 of the telescope 2. Similarly, it is frequently sufficient if the field of view F2 of the wide-angle camera 3 in the object plane 12 is at least six times and in particular at least eight times and in particular at least ten times the field of view F1 of the telescope 2 in the same object plane 12 regarding one dimension.

In this respect it has to be considered that the field of view F2 of the second optical system 38 does not become too large for a certain resolution of the array CCD-detector 31. To guarantee that the representation 17 of the leveling staff 9 can be reliably identified in the picture signal of the array CCD-detector 31, the following formula should be met: $f=(D_{max}*OV*p)/g$, wherein f is the focal length, OV is a preset oversampling to reliably detect a linear element g, and p is the size of a light sensitive element (pixel) of the array CCD-detector 31.

The array CCD-detector 31 does not need to be capable of imaging a scale or pattern 92 provided on the leveling staff 9, but simply has to image the leveling staff 9 in general.

In the above embodiment, the microcomputer 7 identifies the representation 17 of the leveling staff 9 in the picture signal of the array CCD-detector 31 by conducting picture analysis in the two-dimensional image 18 represented by the picture signal.

Additionally or alternatively, the microcomputer 7 might identify the representation 17 of the leveling staff 9 directly in the picture signal by comparing the picture signal with a first preset pattern signal that is stored in a memory 16 connected to the microcomputer 7. Further, alternatively or additionally, the microcomputer 7 may identify the representation 17 of the leveling staff 9 by detecting a characteristic color preset for the respective leveling staff 9 in the picture signal. A plurality of characteristic colors preset for certain leveling staffs 9 might be stored in the memory 16. To facilitate the identification of the leveling staff 9, the user might select the characteristics of the actual leveling staff from plural characteristics of leveling staffs stored in the memory 16.

Moreover, the boarder areas 93, 94 of the shaft 91 of the leveling staff 9 are shown as vertical lines to the array CCD-detector 31 if the leveling staff 9 is in the field of view F2 of the second optical system 38 of the wide-angle camera 3. Thus, according to a further embodiment, the leveling staff 9 is detected in the picture signal by using a "Hough-transformation". This algorithm can expect a vertical geometry under leveling conditions.

As is obvious from FIG. 2, the optical axis 10 and 11 of the telescope 2 and the wide-angle camera 3, respectively, do not necessarily have to be in the same vertical plane. Thus, an offset of the optical axis 11 of the wide-angle camera 3 with respect to a vertical plane defined by the optical axis 10 of the telescope 2 automatically may be considered by the microprocessor 7 when aligning the optical axis 10 of the telescope 2 with the leveling staff 9. In this case, distance information regarding the distance between the electronic leveling apparatus 1 and the leveling staff 9 can additionally be taken into account for a perfect alignment.

Further to aligning the optical axis 10 of the first optical system 28 of the telescope 2 with the leveling staff 9, the microcomputer 7 of the above described electronic leveling apparatus 1 is adapted to control the focusing stepper motor 24 provided in the telescope 2.

In this respect, the electronic leveling apparatus 1 automatically detects an approximate distance between the electronic leveling apparatus 1 and the leveling staff 9 by comparing a length or width of the identified representation 17 of the leveling staff 9 in the picture signal of the wide-angle camera 3 with a preset length or width value for the respective leveling staff 9 that is stored in the memory 16. It is emphasized that any suitable dimension (such as e.g. surface, length and/or width) of the leveling staff 9 can be used in this respect. Based on the detected distance, the microcomputer 7 controls the focusing stepper motor 24 such that the distance D between the first optical system 28 and the object plane 12 automatically is adjusted to the detected approximate distance between the electronic leveling apparatus 1 and the leveling staff 9. Thus, control of the focusing stepper motor 24 is performed by the microcomputer 7 based on the identified representation 17 of the leveling staff 9 in the picture signal received from the array CCD-detector 31 of the wide-angle camera 3.

By controlling the focusing stepper motor 24 based on the picture signal of the wide-angle camera 3, the focus of the first optical system 28 can be automatically pre-adjusted to a distance where the leveling staff 9 is approximately expected. Moreover, in the present embodiment the microcomputer 7 automatically considers the detected distance when actuating the pivoting stepper motor 4 to align the optical axis 10 of the telescope 2 with the leveling staff 9, as the optical axes 10 and 11 of the telescope 2 and the wide-angle camera 3 are not arranged in one common vertical plane.

Additionally, the microcomputer 7 further controls the focusing stepper motor 24 based on the first output signal of the linear CCD-detector 21 by automatically detecting a status of maximum sharpness of the image imaged by the optical lenses 21a, 22b and 22c on the linear CCD-detector 21. This status of maximum sharpness may be detected by varying the gap G between the two lenses 22b and 22c by using the focusing stepper motor 24 until a best sharpness is achieved. In the embodiment shown in FIG. 3, the optical lens 22b that is used for focusing of the first optical system 28 has a positive refraction index.

After the best sharpness (sharp definition of the image) is achieved, the microcomputer 7 calculates an improved distance value for the distance D between the electronic leveling apparatus 1 and the leveling staff 9 based on the reproduction scale of the first optical system 28 of the telescope 2 at the best sharpness. This calculation is described in more detail in the above mentioned essay "Die neuen Digitalnivelliere DiNi 10 und DiNi20". The reproduction scale may be calculated by measuring the distance between the two lenses 22b and 22c or in dependency to an output of the focusing stepper motor 24, for example.

The microcomputer 7 uses this improved distance value together with the output signal of the clinometer 29 to perform the above-mentioned digital correction of an output signal of the linear CCD-detector 21 if the clinometer 29 measures a deviation of the position of the optical axis 10 of the telescope 2 relative to the horizon.

Based on the first output signal received from the linear CCD-detector 21 of the telescope 2, the microcomputer 7 further outputs a leveling signal representing a detected height difference between the electronic leveling apparatus 1 and the leveling staff 9.

Figure 4:
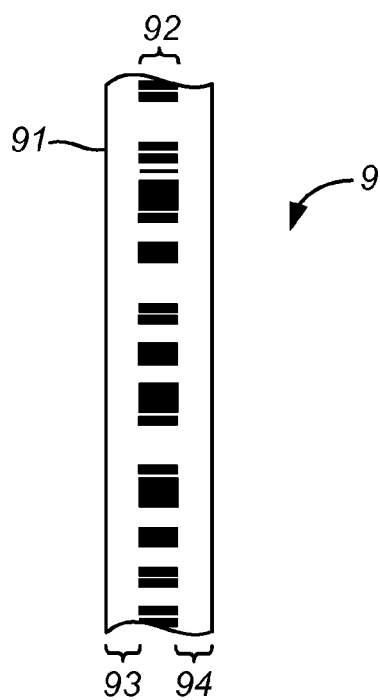
FIG. 4 shows a section of a leveling staff 9 that may be used together with the electronic leveling apparatus according to embodiments of the present invention.

As is shown in FIG. 4, the leveling staff 9 consists of a shank 91 on which a scale 92 in the form of a pattern of alternating light reflectivity is provided. The scale 92 is arranged on the shank 91 in a direction of elongation of the leveling staff 9. On the left and right sides of the scale 92, border portions 93, 94 are provided. In the present embodiment, the shaded areas in FIG. 4, and especially the border portions 93 and 94 are of a lurid yellow color, which might be called "signal color". This color of high reflectivity is usually not found in natural environments. Thus, this color can be used by the microcomputer 7 to identify the leveling staff 9 in the picture signal of the second optical system 38 of the wide-angle camera 3 as described above.

The microcomputer 7 generates the leveling signal representing a detected height difference between the leveling staff 9 and the electronic leveling apparatus 1 by analyzing the pattern of alternating light reflectivity that is contained in the first output signal of the first optical detector 21 if the leveling staff 9 is in the field of view F1 of the first optical system 28 of the telescope 2. The blank areas of the scale 92 of the leveling staff 9 are shown as horizontal lines to the linear CCD-detector 21. The concrete generation of the leveling signal based on the pattern contained in the first output signal to output a height of the electronic leveling apparatus 1 with respect to the leveling staff 9 is well known from the prior art documents cited in the introductory pages of this application.

Figure 7:
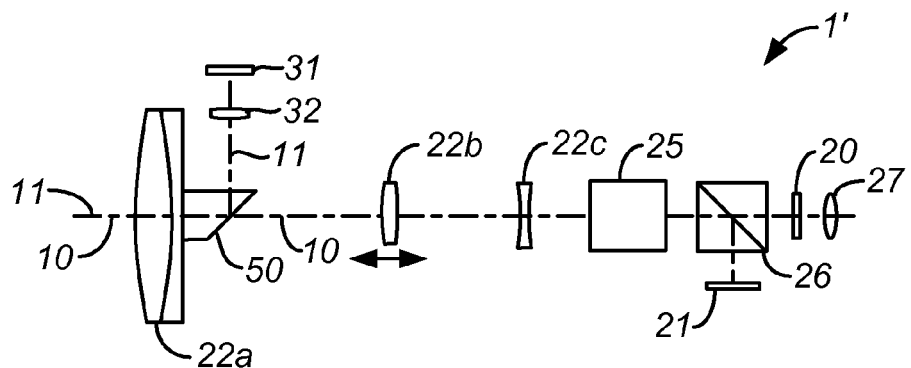
FIG. 7 is a block diagram showing an arrangement of basic parts of the electronic leveling apparatus according to an exemplary embodiment.

FIG. 7 shows an electronic leveling apparatus 1' according to a further exemplary embodiment. According to this embodiment, basically the same elements as in FIG. 3 are used, but the arrangement of these elements is altered. In FIG. 7, the wide-angle camera consists of the optical (entrance) lens 22a, a prism 50, an optical lens 32 and the array CCD-detector 31 (second optical detector). The array CCD-detector 31 is located in the focus of the combination of the optical lenses 22a and 32. The optical lens 32 is selected such that it shortens considerably the focal length of the wide-angle camera in comparison to the telescope. The structure of the telescope in FIG. 7 consists to the structure of the telescope in FIG. 3.

The basic difference to the embodiment of FIG. 3 is that both the telescope and the wide-angle camera are arranged in one common housing and use one common optical entrance lens 22a. Thus, the optical lens 22a is part of both the first optical system of the telescope and the second optical system of the camera. In consequence, both the measurement of the distance by using the linear CCD-detector 21 of the telescope and the capturing of a two-dimensional image 18 by using the array CCD-detector 31 of the wide-angle camera are performed along one common optical axis 10, 11 by using the same optical lens 22a. Therefore, the optical setup of the telescope and the wide-angle camera is coaxial. This facilitates the alignment of the optical axis 10 of the telescope with a position of the identified representation 17 of the leveling staff 9 in the two-dimensional image 18 represented by the picture signal received from the wide-angle camera. The reason is that no offset of the optical axes 10, 11 of the telescope and the wide-angle camera has to be taken into account.

In FIG. 7, prism 50 is glued on the rear surface of lens 22a, which may have a planar surface, to separate the axes 10, 11 of the wide-angle camera and the telescope inside the housing. According to an alternative embodiment, a mirror mounted at an angle of between 30° and 60° and especially 45° can be provided between the optical lens 22a and the optical lens 22b instead of the prism 50. Furthermore, either a semitransparent prism respectively mirror or a small prism respectively mirror can be used.

Figure 8:
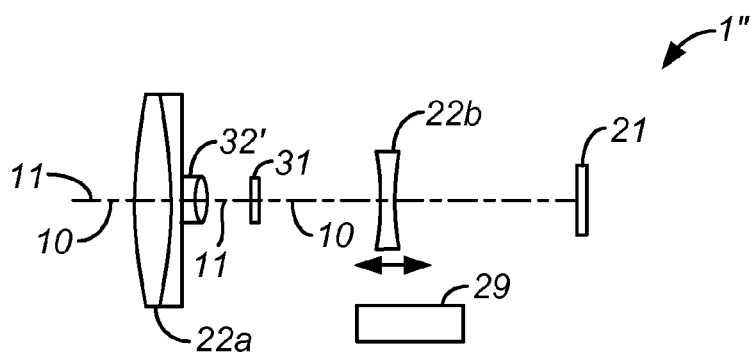
FIG. 8 is a block diagram showing an arrangement of basic parts of the electronic leveling apparatus according to a further exemplary embodiment.

Another exemplary embodiment of an electronic leveling apparatus 1" according to the present invention is shown in FIG. 8. According to this embodiment, the wide-angle camera is aligned coaxially with the telescope and consists of the optical (entrance) lens 22a, the optical lens 32' and the array CCD-detector 31 (second optical detector). The optical lens 32' is directly glued on the rear side of the optical lens 22a. The array CCD-detector 31 is located in the focus of the combination of the optical lenses 22a and 32' in the optical axis 10 of the telescope such that lens 32' is arranged between the array CCD-detector 31 and optical lens 22a. The array CCD-detector 31 blocks the center of the optical axis 10 of the telescope. Thus, a relatively small array CCD-detector 31 is used. If no relatively small array CCD-detector 31 is available, the arrangement of FIG. 7 may be preferred, as prisms or mirrors frequently can be made smaller than array CCD-detectors.

Thus, the main difference between the embodiments of FIGS. 7 and 8 is, that the array CCD-detector 31 of FIG. 7 is located outside the optical axis 10 of the telescope whereas the array CCD-detector 31 of FIG. 8 is located in the optical axis 10 of the telescope. Thus, the prism 50 is avoided in FIG. 8.

Furthermore, in FIG. 8 only a clinometer 29 (inclination detector) but no compensator 25 is used. The clinometer 29 is rigidly mounted in the apparatus with respect to the housing of the telescope and especially the optical axis 10 of the telescope. The clinometer 29 is rotating with the telescope about the fixed vertical axis 5 and adapted to measure a deviation of the optical axis 10 of the telescope from the horizontal plane. Based on the output signal of the clinometer 29 and a measured distance of the leveling staff 9 the output signal of the linear CCD-detector 21 or the measured height difference between the electronic leveling apparatus 1" and the leveling staff 9 is digitally corrected. Finally, the first optical system of the telescope 1" shown in FIG. 8 is facilitated, as it comprises only the optical lenses 22a and 22b.

Figure 9:
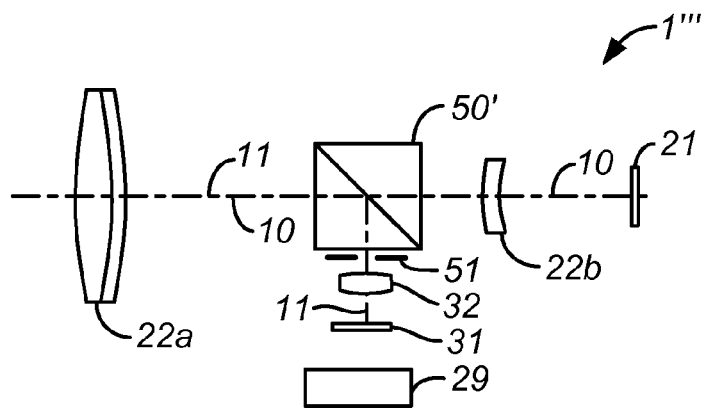
FIG. 9 is a block diagram showing an arrangement of basic parts of the electronic leveling apparatus according to a further exemplary embodiment.

Yet another exemplary embodiment of an electronic leveling apparatus 1''' according to the present invention is shown in FIG. 9. In this embodiment, the first optical system of the telescope comprises the optical (entrance) lens 22a, a beam splitter 50' and the optical (focusing) lens 22b. Thus, the beam splitter 50' is arranged between the lenses 22a and 22b. The second optical system of the camera consists of the lens 22a, the beam splitter 50', an aperture 51 and the optical (focusing) lens 32 that shortens the focal length of the second optical system in comparison to the first optical system. The aperture 51 enhances the depth of focus of the second optical system of the wide-angle camera. Thus, the lens 22a and the beam splitter 50' are commonly used by the telescope and the wide-angle camera.

Both exemplary embodiments shown in FIGS. 8 and 9 do not have an eyepiece. The reason is that an eyepiece is not necessary to manually align the optical axis 10 of the telescope with a leveling staff 9 as the apparatus performs this alignment automatically based on an output signal of the array CCD-detector 31 of the wide-angle camera. Moreover, a user can check the position of the leveling staff in a two-dimensional image 18 captured by the camera by using the array CCD-detector 31. The apparatus does not output a measurement signal if the leveling staff 9 is not aligned with the optical axis 10 of the telescope as the linear CCD-detector 21 cannot detect a pattern 92 of alternating light reflectivity arranged in direction of elongation of the leveling staff 9.

According to a further exemplary embodiment, the detector of the telescope is a two-dimensional (array) sensor. Thus, the position of a leveling staff might be determined in an output signal of the two-dimensional sensor of the telescope to allow a user to check a correct alignment of the leveling staff 9 with the optical axis 10 of the telescope. Thus, the output signal of the respective detectors of both the camera and the telescope might be output to a user e.g. on a display screen. Thus, no eyepiece is required.

It is emphasized that FIGS. 7 to 9 show only the main elements of the respective electronic leveling apparatus 1', 1", 1'''. Similar to the embodiment shown in FIGS. 1 and 3 a controller such as a microprocessor, a user interface such as e.g. a touch screen, a display and a keypad, a memory etc. might be provided. Furthermore, the apparatus comprises an actuator for rotating said telescope and said camera about a vertical axis. One or plural additional actuators for actuating optical elements of the telescope and/or camera might be further provided.

The electronic leveling apparatus does not necessarily have to comprise all elements of the above-described embodiments. Moreover, additional elements like e.g. a power supply (e.g. a battery) or e.g. a remote control unit might be provided. The display 14 either might be integrated into the housing 23 of the telescope 2 or the housing 33 of the wide-angle camera 3. Alternatively even a separate display means like a PDA (personal digital assistant) or PC (personal computer) might be used.

Although different exemplary embodiments of both a parallel and a coaxial arrangement of the optical axes of the camera and the telescope are shown in the Figures, the present invention is not restricted to these exemplary embodiments. Thus, combinations or variations of these embodiments are possible.

It is obvious that the present invention is not limited to the above-described use of stepper motors. Any other known actuator adapted to rotate the telescope 2 and the wide-angle camera 3 around the fixed vertical axis 5, or to vary the distance D between the first optical system 28 and the object plane 12 may be used instead. For example, an optical lens having a variable refraction might be used instead of the focusing stepper motor and one of the optical lenses of the first optical system 28.

Moreover, it is obvious that both the size and kind of optical detector used as array CCD-detector 31 respectively linear CCD-detector 21 can be varied. Furthermore, the detector can either be a color or a black and white detector. In the above embodiment the array CCD-detector 31 is a color detector and the linear CCD-detector 21 is a black/white detector.

Embodiments of an electronic leveling apparatus for optically measuring a height difference relative to a leveling staff comprise a telescope, a camera fixed to the telescope, a first actuator for rotating both said telescope and said camera in a horizontal plane about a fixed vertical axis of the apparatus, and a controller. The camera has a depth of focus that is at least twice a depth of focus of the telescope. The controller uses a first output signal from said telescope to output a leveling signal representing a detected height difference. The controller uses a second output signal from said camera to identify a representation of a leveling staff and to control the first actuator based on the identified representation of the leveling staff.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. An electronic leveling apparatus for optically measuring a height difference relative to a leveling staff, said apparatus comprising:
    a telescope including a first optical detector and a first optical system for generating an image on the first optical detector;
    a camera including a second optical detector and a second optical system for generating an image on the second optical detector, wherein an orientation of the camera is fixed relative to the telescope;
    a first actuator for rotating both said telescope and said camera in a horizontal plane about a fixed vertical axis of the apparatus; and
    a controller;
    wherein the controller is configured to receive a first output signal from said first optical detector and to output a leveling signal representing a detected height difference based on the first output signal from the first optical detector;
    wherein the second optical system has a depth of focus that is at least twice a depth of focus of the first optical system; and
    wherein the controller is further configured to receive a second output signal from said second optical detector, to identify a representation of the leveling staff in the second output signal received from the second optical detector, and to control said first actuator based on the identified representation of the leveling staff.

2. The electronic leveling apparatus according to claim 1 wherein the second optical system has a depth of focus that is a at least four times the depth of focus of the first optical system and in particular at least ten times the depth of focus of the first optical system.

3. The electronic leveling apparatus according to claim 1 wherein a field of view of the second optical system in a certain object plane regarding one dimension is at least six times a field of view of the first optical system in the same object plane and in particular at least eight times the field of view of the first optical system in the same object plane and further in particular at least ten times the field of view of the first optical system in the same object plane.

4. The electronic leveling apparatus according to claim 1 wherein the controller is configured to control said first actuator such that an optical axis of the first optical system is aligned with the identified representation of the leveling staff.

5. The electronic leveling apparatus according to claim 1 wherein the controller is configured to identify a representation of the leveling staff in the second output signal by comparing the second output signal of the second optical detector with a first preset pattern signal.

6. The electronic leveling apparatus according to claim 1 wherein the controller is configured to identify a representation of the leveling staff by detecting a characteristic color preset for a respective leveling staff in the second output signal of the second optical detector.

7. The electronic leveling apparatus according to claim 1 wherein the controller is configured to identify the representation of the leveling staff by conducting picture analysis in a two-dimensional image represented by the picture signal.

8. The electronic leveling apparatus according to claim 7 wherein the first optical system comprises
    a plurality of optical lenses for generating the image on the first optical detector; and
    a second actuator for adjusting a distance between the first optical system and an object plane imaged by optical lenses of the first optical system on the first optical detector.

9. The electronic leveling apparatus according to claim 8 wherein the controller is configured to control said second actuator based on the second output signal received from said second optical detector.

10. The electronic leveling apparatus according to claim 8 wherein the controller is configured to control said second actuator based on the first output signal of the first optical detector.

11. The electronic leveling apparatus according to claim 7 wherein the controller is configured to detect a distance between the electronic leveling apparatus and the leveling staff based on the identified representation of the leveling staff by comparing a size of the identified representation of the leveling staff in the second output signal with a preset value for a respective leveling staff.

12. The electronic leveling apparatus according to claim 7 wherein said first optical detector is a one-dimensional sensor having a row of light sensitive elements and said second optical detector is a two-dimensional sensor having an array of light sensitive elements.

13. The electronic leveling apparatus according to claim 1 comprising a compensator for maintaining an optical axis of said first optical system horizontal.

14. The electronic leveling apparatus according to claim 1 comprising a clinometer, wherein the clinometer is adapted for measuring a deviation of a position of an optical axis of said first optical system relative to the horizon.

15. The electronic leveling apparatus according to claim 1 wherein:
    the leveling staff has a pattern of alternating light reflectivity arranged in direction of elongation of the leveling staff; and
    the controller is configured to generate said leveling signal representing a detected height difference by analyzing the respective pattern of the leveling staff contained in the first output signal of the first optical detector.

16. The electronic leveling apparatus according to claim 1 wherein at least a section of a first optical axis of the first optical system of the telescope and at least a section of a second optical axis of the second optical system of the camera coincide.

17. The electronic leveling apparatus according to claim 16 further comprising a beam splitter to separate the first and second optical axes by directing the first optical axis towards the first optical detector and by directing the second optical axis towards the second optical detector.

18. A method for optically measuring a height difference of an electronic leveling apparatus relative to a leveling staff, the apparatus comprising a first optical detector and a first optical system for generating an image on the first optical detector, and a second optical detector and a second optical system for generating an image on the second optical detector, wherein an orientation of the second optical system is fixed relative to the first optical system, and wherein the second optical system has a depth of focus that is at least twice a depth of focus of the first optical system, the method comprising:
    receiving a second output signal from said second optical detector;
    identifying a representation of the leveling staff in the second output signal received from the second optical detector;

rotating said first optical detector, said first optical system, said second optical detector and said second optical system simultaneously in a horizontal plane about a fixed vertical axis based on the identified representation of the leveling staff;

receiving a first output signal from said first optical detector; and outputting a leveling signal representing a detected height difference based on the first output signal from the first optical detector.

19. The method according to claim 18 wherein the step of identifying a representation of the leveling staff in the second output signal received from the second optical detector is performed by conducting picture analysis in a two-dimensional image represented by the picture signal.

20. A computer-readable carrier containing information representing a computer program adapted to cause a processing unit of an electronic leveling apparatus to perform a procedure according to claim 18.

21. A computer-readable carrier containing information representing a computer program adapted to cause a processing unit of an electronic leveling apparatus to perform a procedure according to claim 19.

* * * * *